(12) United States Patent
Sugimoto et al.

(10) Patent No.: US 8,189,687 B2
(45) Date of Patent: May 29, 2012

(54) DATA EMBEDDING APPARATUS, DATA EXTRACTING APPARATUS, DATA EMBEDDING METHOD, AND DATA EXTRACTING METHOD

(75) Inventors: Kazuo Sugimoto, Tokyo (JP); Shunichi Sekiguchi, Tokyo (JP); Yuichi Idehara, Tokyo (JP); Yoshihisa Yamada, Tokyo (JP); Yoshiaki Kato, Tokyo (JP); Kohtaro Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1299 days.

(21) Appl. No.: 11/851,889

(22) Filed: Sep. 7, 2007

(65) Prior Publication Data

US 2008/0219348 A1 Sep. 11, 2008

(30) Foreign Application Priority Data

Mar. 6, 2007 (JP) ................................. 2007-055913

(51) Int. Cl.
*H04N 7/12* (2006.01)
(52) U.S. Cl. ......... 375/240.27; 375/240.12; 375/240.13; 375/240.14; 375/240.15
(58) Field of Classification Search ............ 375/240.027
See application file for complete search history.

(56) References Cited

U.S. PATENT DOCUMENTS

| 6,975,770 B2 * | 12/2005 | Kondo et al. ................. 382/238 |
| 2008/0205508 A1 * | 8/2008 | Ziauddin et al. ......... 375/240.01 |
| 2011/0293013 A1 * | 12/2011 | Ma et al. ................... 375/240.16 |

FOREIGN PATENT DOCUMENTS

WO WO98/17061 4/1998

* cited by examiner

*Primary Examiner* — David Y Jung
(74) *Attorney, Agent, or Firm* — Oblon, Spivak, McClelland, Maier & Neustadt, L.L.P.

(57) ABSTRACT

A data embedding apparatus including: a selecting unit for selecting, based upon the second data, a prediction system of calculating a prediction value with respect to data to be processed within the first data; a predicting unit for calculating the prediction value of the data to be processed by the prediction system selected by the selecting unit; a difference calculating unit for calculating a prediction error of the data to be processed by employing the prediction value; and a prediction error calculating unit for outputting the coded data, in which the predicting unit includes: a 0-embedding time predicting unit for performing prediction when a bit value of the second data is "0"; a 1-embedding time predicting unit for performing prediction when the bit value of the second data is "1"; and an embedding end time predicting unit for performing prediction when embedding of the second data is accomplished.

16 Claims, 11 Drawing Sheets

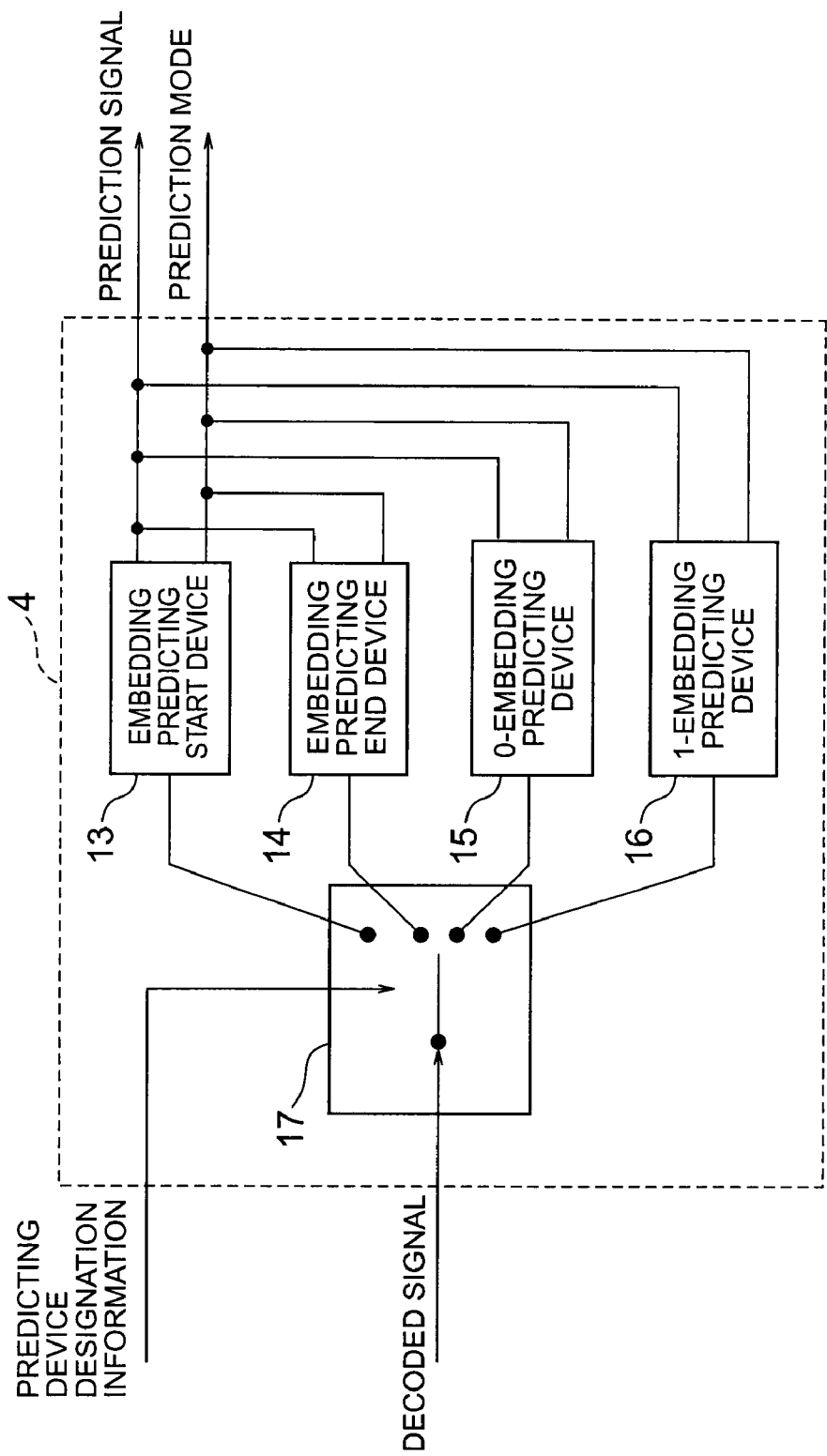

FIG. 7

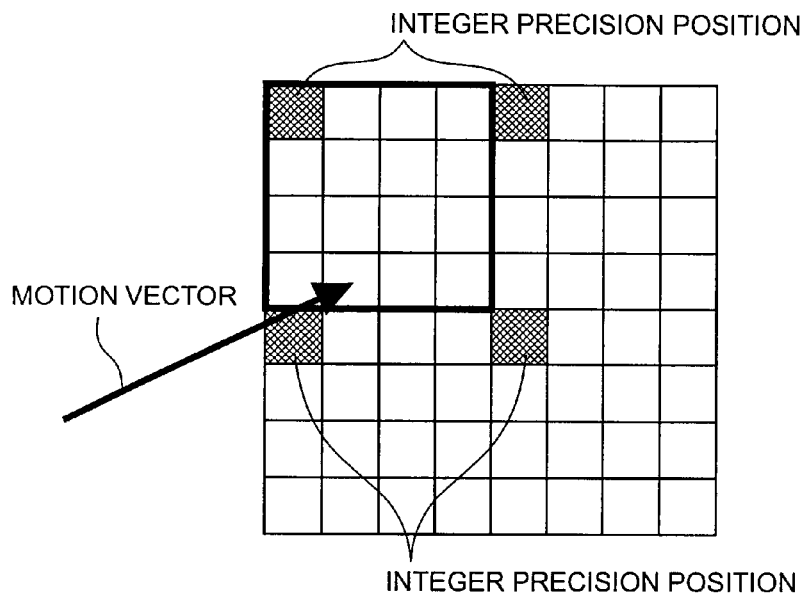

FIG. 8

| EMBEDDING PREDICTING START DEVICE | 4X4 INTRA PREDICTION MODE 8<br>8X8 INTRA PREDICTION MODE 8 |
|---|---|
| EMBEDDING PREDICTING END DEVICE | 4X4 INTRA PREDICTION MODE 8<br>8X8 INTRA PREDICTION MODE 8 |
| 0-EMBEDDING PREDICTING DEVICE | 4X4 INTRA PREDICTION MODES 1, 3, 5, 7<br>8X8 INTRA PREDICTION MODES 0, 2, 4, 6<br>16X16 INTRA PREDICTION MODES 0, 2 |
| 1-EMBEDDING PREDICTING DEVICE | 4X4 INTRA PREDICTION MODES 0, 2, 4, 6<br>8X8 INTRA PREDICTION MODES 1, 3, 5, 7<br>16X16 INTRA PREDICTION MODES 1, 3 |

DATA EMBEDDING APPARATUS, DATA EXTRACTING APPARATUS, DATA EMBEDDING METHOD, AND DATA EXTRACTING METHOD

BACKGROUND OF THE INVENTION

1. Field of the Invention

The present invention relates to a data embedding apparatus and a data embedding method which embed other data in media data, and a data extracting apparatus and a data extracting method which extract the embedded data.

2. Description of the Related Art

As a method of embedding other data in media data such as moving images, WO98/17061 discloses a method in which when media data is coded, the media data is divided into frames, and further, each of the divided frames is divided into a plurality of small regions. Thereafter, when coding modes are determined with respect to the respective small regions obtained through division, coding modes corresponding to information to be embedded are selected.

Extraction of information embedded by the above-mentioned embedding method from the media data is realized by outputting information corresponding to the coding mode which is obtained by decoding the media data.

However, in the conventional data embedding method, positions at which data have been embedded must be commonly utilized on the coding side and the decoding side. For instance, when embedding positions are changed for each of frames in the conventional data embedding method, an amount of embedding position specifying information is increased. As a result, there is a problem in that an entire data amount is increased.

Also, since embedding of data has been realized by causing the coding modes of the small regions to correspond to the embedding information, the embedding information largely influences the coding efficiency. Accordingly, there is another problem in that if the data amount of the embedding information is increased, the data amount of the media data is also increased.

SUMMARY OF THE INVENTION

An object of the present invention is to provide a data embedding apparatus for coding data in such a manner that embedding information hardly influences a coding efficiency, without increasing an entire data amount, a data extracting apparatus, a data embedding method, and a data extracting method.

According to an aspect of the present invention, there is provided a data embedding apparatus for outputting coded data produced by coding first data with second data being embedded therein, including: selecting means for selecting, based upon the second data, a prediction mode of calculating a prediction value with respect to data to be processed within the first data; predicting means for calculating the prediction value of the data to be processed by the prediction mode selected by the selecting means; difference calculating means for calculating a prediction error of the data to be processed by employing the prediction value; and prediction error calculating means for outputting the coded data, in which the predicting means includes: 0-embedding time predicting means for performing prediction when a bit value of the second data is "0"; 1-embedding time predicting means for performing prediction when the bit value of the second data is "1"; and embedding end time predicting means for performing prediction when embedding of the second data is accomplished.

According to the data embedding apparatus of the present invention, the following effects can be achieved. That is, when the media data is coded, one prediction mode of a large number of prediction modes is allocated as the data embedding start position information, and one prediction mode of those prediction modes is allocated as the data embedding end position information. Therefore, the information for specifying the embedding position does not need to be shared on the encoding side and the decoding side. Thus, it is possible to prevent the entire data amount from increasing.

Also, when the media data is coded, the resembling prediction modes among the large number of prediction modes are subdivided into 2 groups, and each of those 2 groups is made to correspond to the embedding information. As a result, the embedding information hardly influences the coding efficiency. Thus, even when the data amount of the embedding information is increased, it is possible to prevent the data amount of the media data from increasing.

BRIEF DESCRIPTION OF THE DRAWINGS

In the accompanying drawings:

FIG. 2 is a block diagram for showing a configuration of a signal predicting unit according to the first embodiment of the present invention;

FIG. 7 is a conceptional diagram for showing a motion vector of the H.264 coding system;

FIG. 8 is a diagram for showing an example of intra prediction modes which are allocated to respective predicting devices of the signal predicting unit according to the first embodiment of the present invention;

DETAILED DESCRIPTION OF THE PREFERRED EMBODIMENTS

First Embodiment

Figure 1:
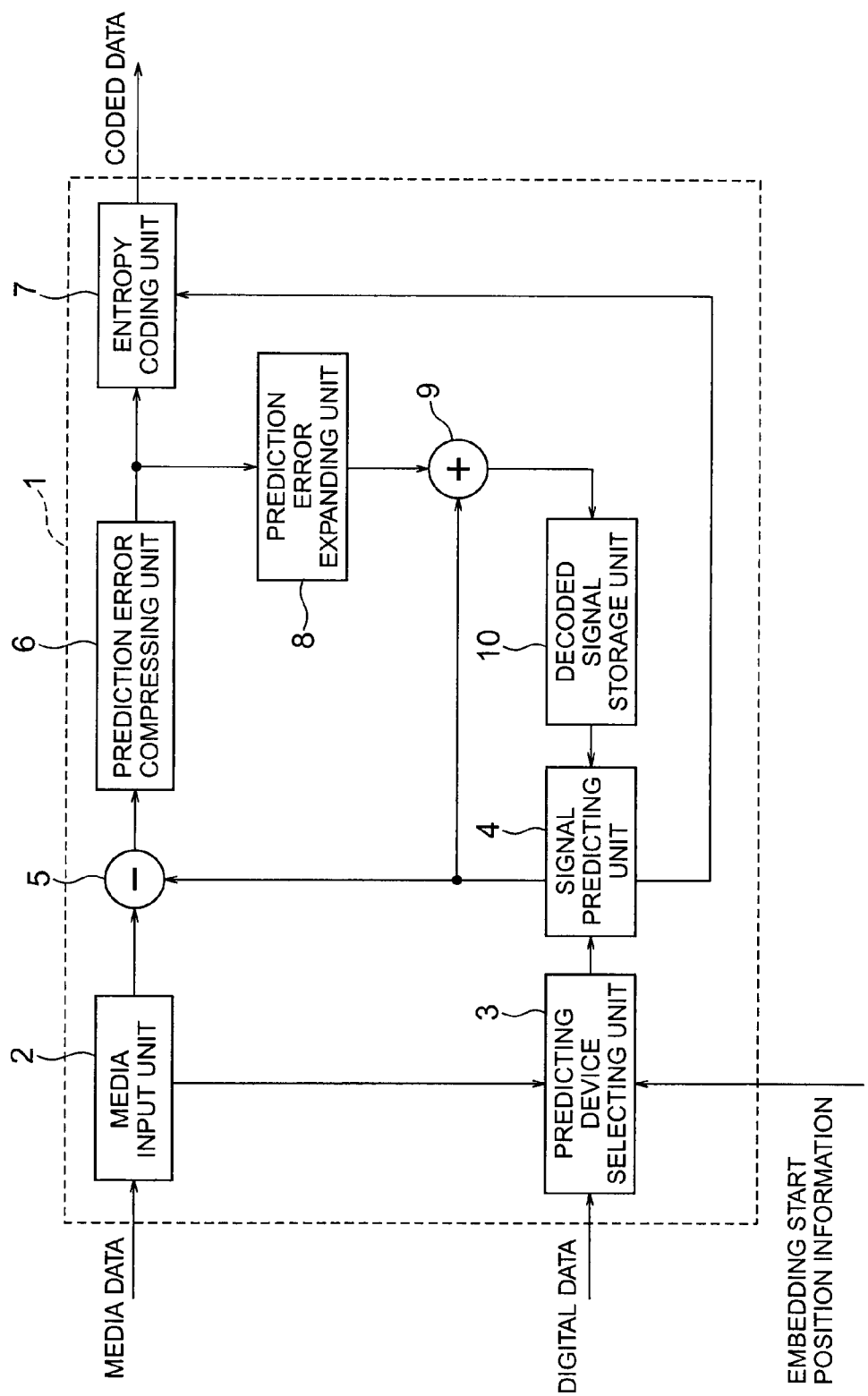
FIG. 1 is a block diagram for showing a configuration of a data embedding apparatus according to a first embodiment of the present invention.

FIG. 1 is a block diagram for showing a configuration of a data embedding apparatus 1 according to a first embodiment of the present invention.

To the data embedding apparatus 1 according to the first embodiment, media data such as image data and acoustic data to be encoded, digital data to be embedded in the media data, and embedding start position information are supplied. In the first embodiment, image data is applied as the media data, and an H.264 coding system is exemplified as a coding system. It should be noted that the coding system employed in the present invention is not limited to the H.264 coding system.

The data embedding apparatus 1 is an apparatus which encodes the media data and sequentially embeds digital data in the media data from the embedding start position, so the coded data is obtained to be outputted. The data embedding apparatus 1 contains a media data input unit 2, a predicting device selecting unit 3 functioning as selecting means, a signal predicting unit 4 functioning as predicting means, a difference calculating unit 5 functioning as difference calculating means, a prediction error compressing unit 6 functioning as prediction error compressing means, an entropy coding unit 7 functioning as entropy coding means, a prediction error expanding unit 8 functioning as prediction error expanding means, an adding unit 9 functioning as adding means, and a decoded signal storage unit 10 functioning as decoded data storage means.

It should be noted that the prediction error compressing unit 6 and the entropy coding unit 7 will collectively be referred to as "prediction error calculating means" hereinafter.

The data embedding apparatus 1 is composed of a computer including a CPU, a ROM, a RAM, and an interface circuit. In the data embedding apparatus 1, a program stored in the ROM is read out, and the read program is subjected to calculation processing by the CPU so as to encode media data. In addition, by sequentially embedding digital data in the encoded media data from an embedding start position, the data embedding apparatus 1 obtains the coded data for output.

The coded data outputted by the data embedding apparatus 1 is recorded on a recording medium such as a semiconductor memory, a magneto-optical disk, a magnetic disk, an optical disk, a magnetic tape, and a phase change disk. Further, the coded data is transmitted via a transmission medium such as a ground wave broadcast, a satellite line, a cable television (CATV) network, the Internet, and a public line.

It should be noted that as the digital data, for example, not only text data and acoustic data related to an original image and a reduced image obtained by reducing a size of the original image, but also data unrelated to the original image can be employed. In other words, as the digital data, various sorts of data including a program can be employed.

In the first embodiment, it is assumed that the digital data is information that is in correspondence with respective frames, and that embedding positions in the respective frames have different data lengths in the respective frames which are determined based upon the embedding start position information.

The media data to be encoded is supplied to the media data input unit 2, whereas digital data to be embedded to the media data is supplied to the predicting device selecting unit 3.

The media data input unit 2 stores thereinto the supplied media data in the unit of, for example, 1 frame, and supplies the stored media data as an input signal to the difference calculating unit 5 for every small region obtained by further dividing the frame.

Also, the media data input unit 2 supplies time instant information indicative of a frame number and positional information indicative of a position within a frame of a small region to be processed to the predicting device selecting unit 3.

A small region to be processed may be a macroblock or a block in the H.264 coding system, regarding picture data.

The predicting device selecting unit 3 outputs a "non-embedding signal" as predicting device designation information to the signal predicting unit 4 until a small region to be processed which is specified by both time instant information and positional information becomes an information embedding start small region within the frame to be processed indicated by frame embedding start position information inputted to the predicting device selecting unit 3.

Also, the predicting device selecting unit 3 outputs an "embedding start signal" as predicting device designation information to the signal predicting unit 4 in the case where the small region to be processed corresponds to the information embedding start small region.

Further, the predicting device selecting unit 3 outputs 1 bit at a time to the signal predicting unit 4 digital data sequentially inputted from a small region to be processed which is located subsequent to the embedding start small region in the coding sequence, as predicting device designation information. That is, when a value to be embedded is "0", the predicting device selecting unit 3 outputs a "0-embedding signal" as the predicting device designation information to the signal predicting unit 4, whereas when a value to be embedded is "1", the predicting device selecting unit 3 outputs a "1-embedding signal" as the predicting device designation information to the signal predicting unit 4.

In the case where all pieces of the digital data to be associated with the relevant frame to be processed have been embedded, the predicting device selecting unit 3 outputs an "embedding end signal" to the signal predicting unit 4 as the predicting device designation information in a process of a further next small region.

As shown in FIG. 2, the signal predicting unit 4 is equipped with an embedding predicting start device 13 functioning as embedding start time predicting means, an embedding predicting end device 14 functioning as embedding end time predicting means, a 0-embedding predicting device 15 functioning as 0-embedding time predicting means, a 1-embedding predicting device 16 functioning as 1-embedding time predicting means, and a switch circuit 17.

Also, the signal predicting unit 4 is provided with a plurality of predicting means such as an intra prediction mode and a motion compensating prediction of the H.264 coding system. Among the plurality of predicting means, at least one predicting means is provided as the embedding predicting start device 13; at least one predicting means which is identical to or different from the embedding predicting start device 13 is provided as the embedding predicting end device 14; at least one predicting means which is different from the embedding predicting start device 13 and the embedding predicting end device 14 is provided as the 0-embedding predicting device 15; and at least one predicting means which is different from anyone of the embedding predicting start device 13, the embedding predicting end device 14, and the 0-embedding predicting device 15 is provided as the 1-embedding predicting device 16.

The switch circuit 17 is operated so as to select a proper predicting device from the plurality of above-mentioned predicting devices in accordance with a predetermined rule based upon predicting device designation information entered from the predicting device selecting unit 3. In other words, when the predicting device designation information corresponds to the "embedding start signal", the switch circuit 17 is operated so as to select as the predicting device, the embedding predicting start device 13.

Also, when the predicting device designation information corresponds to the "embedding end signal", the switch circuit 17 is operated so as to select as the predicting device, the embedding predicting end device 14.

Also, when the predicting device designation information corresponds to the "0-embedding signal", the switch circuit 17 is operated so as to select as the predicting device, the 0-embedding predicting device 15.

Also, when the predicting device designation information corresponds to the "1-embedding signal", the switch circuit 17 is operated so as to select as the predicting device, the 1-embedding predicting device 16.

Further, when the predicting device designation information corresponds to the "non-embedding signal", the switch circuit 17 is operated so as to select as the predicting device, a predicting device whose coding efficiency is optimum among the embedding predicting start device 13, the embedding predicting end device 14, the 0-embedding predicting device 15, and the 1-embedding predicting device 16.

The predicting device selected in the above-mentioned manner produces a prediction signal with respect to the input signal for the small region to be processed by employing a decoded signal inputted from the decoded signal storage unit 10, and then, outputs the prediction signal to the difference calculating unit 5 and the adding unit 9. Also, the selected predicting device outputs information for identifying the selected predicting device to the entropy coding unit 7 as prediction mode information.

Specifically, when the H.264 coding system is taken as an example, examples of the predicting means with respect to an interframe coding macroblock include 9 sorts of 4×4 intra prediction modes as shown in FIGS. 3A to 3I, 9 sorts of 8×8 intra prediction modes as shown in FIGS. 4A to 4I, 4 sorts of 16×16 intra prediction modes as shown in FIGS. 5A to 5D, and 4 sorts of color difference intra prediction modes as shown in FIGS. 6A to 6E.

Figure 3A:
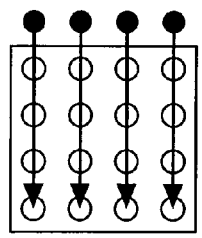
FIGS. 3A to 3I are conceptional diagrams for showing a 4×4 intra prediction mode of an H.264 coding system.
Figure 3B:
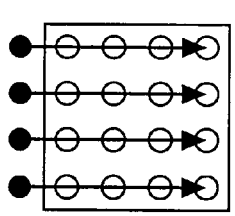
Figure 3C:
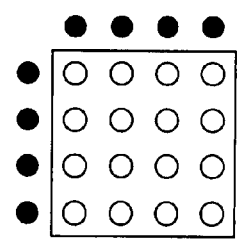
Figure 3D:
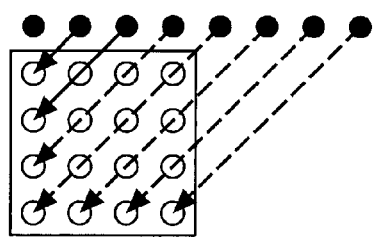
Figure 3E:
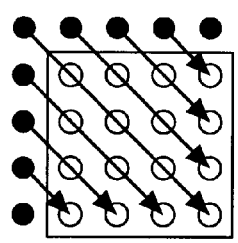
Figure 3F:
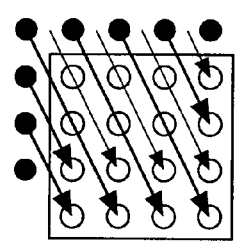
Figure 3G:
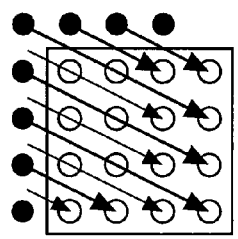
Figure 3H:
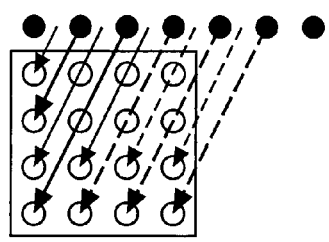
Figure 3I:
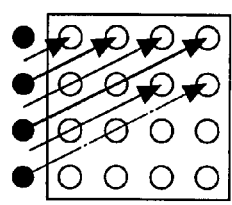

The 9 sorts of 4×4 intra prediction modes are: a 4×4 intra prediction mode 0 shown in FIG. 3A; a 4×4 intra prediction mode 1 shown in FIG. 3B; a 4×4 intra prediction mode 2 shown in FIG. 3C; a 4×4 intra prediction mode 3 shown in FIG. 3D; a 4×4 intra prediction mode 4 shown in FIG. 3E; a 4×4 intra prediction mode 5 shown in FIG. 3F; a 4×4 intra prediction mode 6 shown in FIG. 3G; a 4×4 intra prediction mode 7 shown in FIG. 3H; and a 4×4 intra prediction mode 8 shown in FIG. 3I.

Figure 4A:
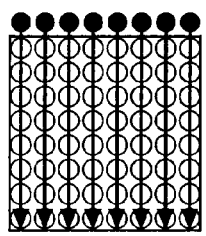
FIGS. 4A to 4I are conceptional diagrams for showing an 8×8 intra prediction mode of an H.264 coding system.
Figure 4B:
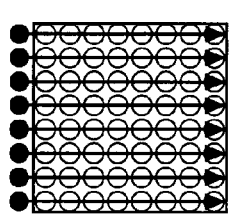
Figure 4C:
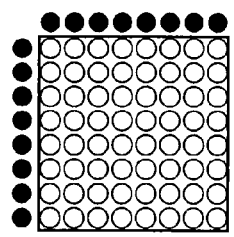
Figure 4D:
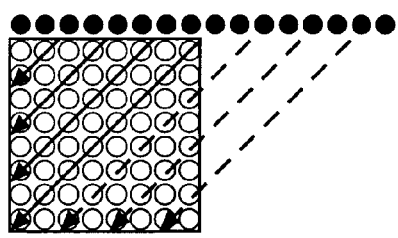
Figure 4E:
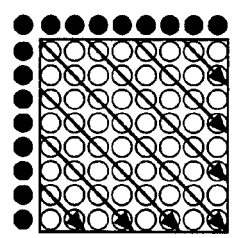
Figure 4F:
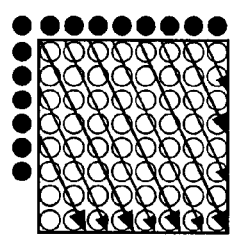
Figure 4G:
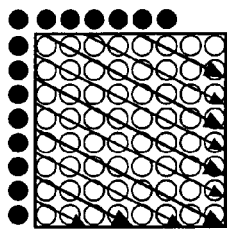
Figure 4H:
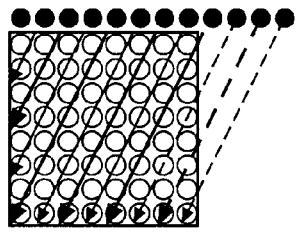
Figure 4I:
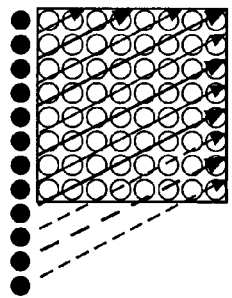

The 9 sorts of 8×8 intra prediction modes are: an 8×8 intra prediction mode 0 shown in FIG. 4A; an 8×8 intra prediction mode 1 shown in FIG. 4B; an 8×8 intra prediction mode 2 shown in FIG. 4C; an 8×8 intra prediction mode 3 shown in FIG. 4D; an 8×8 intra prediction mode 4 shown in FIG. 4E; an 8×8 intra prediction mode 5 shown in FIG. 4F; an 8×8 intra prediction mode 6 shown in FIG. 4G; an 8×8 intra prediction mode 7 shown in FIG. 4H; and an 8×8 intra prediction mode 8 shown in FIG. 4I.

Figure 5A:
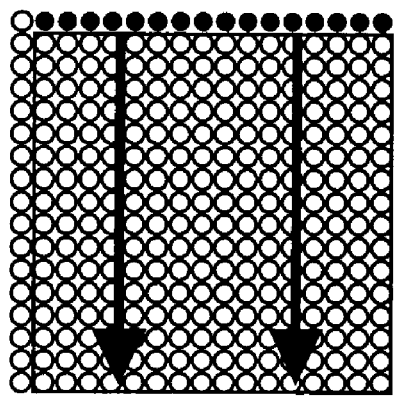
FIGS. 5A to 5D are conceptional diagrams for showing a 16×16 intra prediction mode of the H.264 coding system.
Figure 5B:
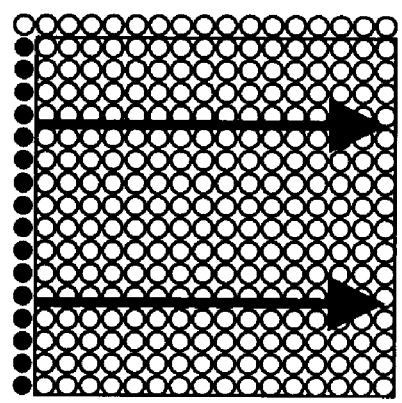
Figure 5C:
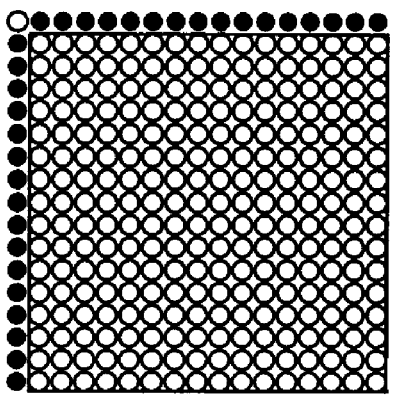
Figure 5D:
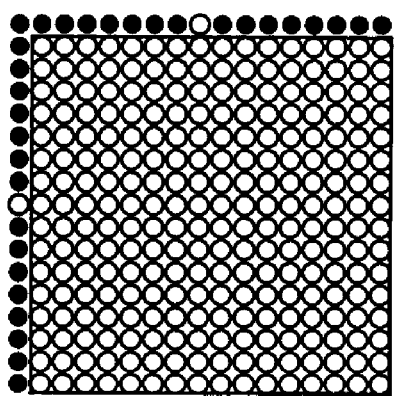

The 4 sorts of the 16×16 intra prediction modes are: a 16×16 intra prediction mode 0 (prediction in vertical direction) shown in FIG. 5A; a 16×16 intra prediction model (prediction in horizontal direction) shown in FIG. 5B; a 16×16 intra prediction mode 2 (DC prediction) shown in FIG. 5C; and a 16×16 intra prediction mode 3 (plane prediction) shown in FIG. 5D. FIG. 5E shows an example of a prediction signal produced in the Plane prediction.

Figure 6A:
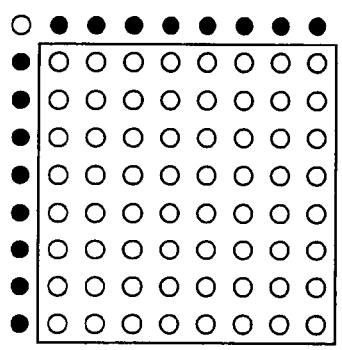
FIGS. 6A to 6E are conceptional diagrams for showing a color difference intra prediction mode of the H.264 coding system.
Figure 6B:
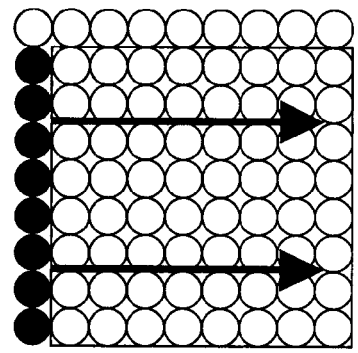
Figure 6C:
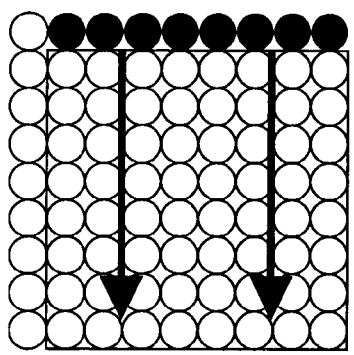
Figure 6D:
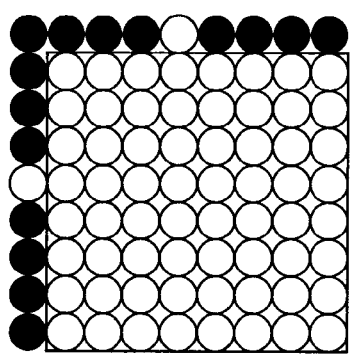
Figure 6E:
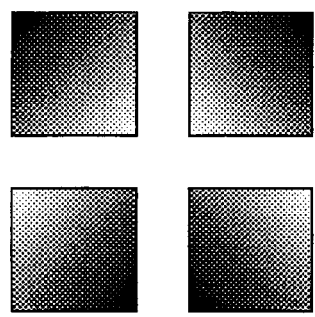
Figure 9:
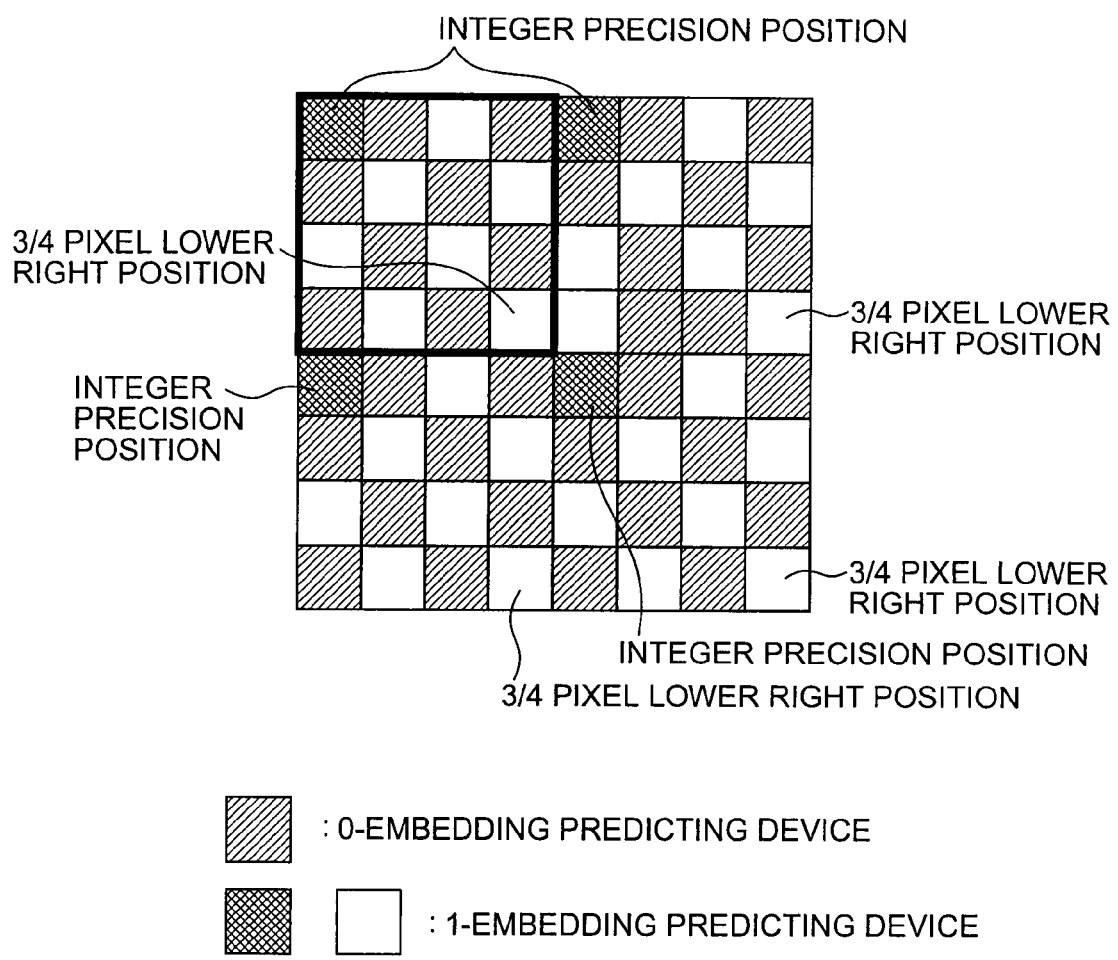
FIG. 9 is a diagram for showing an example of motion vectors which are allocated to the respective predicting devices of the signal predicting unit according to the first embodiment of the present invention.

The 4 sorts of color difference intra prediction modes are: a color difference intra prediction mode 0 (DC prediction) shown in FIG. 6A; a color difference intra prediction mode 1 (prediction in horizontal direction) shown in FIG. 6B; a color difference intra prediction mode 2 (prediction in vertical direction) shown in FIG. 6C; and a color difference intra prediction mode 3 (plane prediction) shown in FIG. 6D.

Also, with respect to a frame-to-frame coding macroblock, in motion compensating prediction by a motion vector, as shown in FIG. 7, 16 sorts of different predicting means may be realized by which both a vertical component and a horizontal component of the motion vector are indicated by decimal pixel positions of both a downward direction and a rightward direction with respect to positions of integer pixel precision respectively.

For example, as shown in FIG. 8, as a prediction mode of the embedding predicting start device 13, a motion compensating prediction mode is allocated which employs the 4×4 intra prediction mode 8, the 8×8 intra prediction mode 8, and a motion vector. This motion vector indicates a position as to ¾ pixels in the downward direction and ¾ pixels in the rightward direction with respect to a position of integer pixel precision among motion vector positions shown in FIG. 9.

Similarly, allocated as a prediction mode of the embedding predicting end device 14 is a motion compensating prediction mode which employs the 4×4 intra prediction mode 8, the 8×8 intra prediction mode 8, and a motion vector. This motion vector indicates a position as to ¾ pixels in the downward direction and ¾ pixels in the rightward direction with respect to a position of integer pixel precision among motion vector positions.

Also, allocated as a prediction mode of the 0-embedding predicting device 15 are: the 4×4 intra prediction modes 1, 3, 5, and 7; the 8×8 intra prediction modes 0, 2, 4, and 6; the 16×16 intra prediction modes 0 and 2; and a motion compensating prediction mode. In the motion compensating prediction mode, a motion vector indicates a decimal pixel position indicated by a hatching line in FIG. 9 with respect to positions of integer pixel precision.

Also, the 1-embedding predicting device 16 allocates all of the predicting means except the above-mentioned predicting means.

As previously described, the predicting devices whose occurrence frequencies are low are allocated to the embedding predicting start device 13 and the embedding predicting end device 14. As a result, there is an advantage that lowering of the entire coding efficiency can be prevented.

Also, as described above, since the predicting means which are resembled to both the predicting means of the prediction mode of the 0-embedding predicting device 15, and the predicting means of the prediction mode of the 1-embedding predicting device 16 are allocated, the choices of the predicting means during the respective embedding operations are increased. As a result, there are other advantages that lowering of the prediction precision can be avoided, and lowering of the entire coding efficiency can be avoided.

It should be noted that the intra prediction modes and the motion vector positions, which are allocated to the respective predicting devices, are not limited to the above-mentioned examples. That is, even to any combinations of prediction modes, the present invention may be applied. For example, as the intra prediction mode of the 0-embedding predicting device 15, it is possible to allocate the 4×4 intra prediction modes 0, 1, 2, 3, and the 8×8 intra prediction modes 4, 5, 6, 7, whereas as the intra prediction mode of the 1-embedding predicting device 16, it is possible to allocate the 4×4 intra prediction modes 4, 5, 6, 7, and the 8×8 intra prediction modes 0, 1, 2, 3.

Also, in the first embodiment, the intra prediction mode of the H.264 coding system and the motion compensating prediction mode have been exemplified. Alternatively, in any types of prediction systems using motion vectors, and any types of voice/acoustic/picture/image coding systems having a plurality of prediction modes, similar advantages may be achieved.

The difference calculating unit 5 performs a difference calculating operation between an input signal entered from the media data input unit 2 and a prediction signal entered from the signal predicting unit 4 to obtain a prediction error signal, and then outputs the prediction error signal to the prediction error compressing unit 6.

The prediction error compressing unit 6 performs a data compressing operation with respect to the prediction error signal entered from the difference calculating unit 5, and then, outputs the data-compressed prediction error signal as a coding parameter to both the entropy coding unit 7 and the prediction error expanding unit 8. The data compressing operation is carried out by, for example, an orthogonal transformation, a base transformation, a waveform transformation, a quantization, and the like.

In a specific case of the H.264 coding system, with respect to the prediction error signal, an integer orthogonal transformation is performed in the unit of either 4×4 pixels or 8×8 pixels, and subsequently, a quantization is carried out, so the coded parameter is produced.

In the first embodiment, the integer orthogonal transformation and the quantization of the H.264 coding system are described as an example. However, in any sorts of transforming/quantizing systems such as DCT, DFT, a wavelet transformation, and a vector quantization, similar effects may be achieved.

The entropy coding unit 7 entropy-codes both the prediction mode information entered from the signal predicting unit 4 and the coded parameter entered from the prediction error compressing unit 6, and outputs the resultant data as coded data.

In a specific case of the H.264 coding system, either a Huffman coding system or an arithmetic coding system is applied, so the coded data is outputted as a bit stream. Even in any other entropy coding systems, similar effects may be achieved.

The prediction error expanding unit 8 performs processings which correspond to inverse processings as to the processings executed in the prediction error compressing unit 6 with respect to the coding parameter entered from the prediction error compressing unit 6 so as to produce a decoded prediction error signal, and then, outputs the decoded prediction error signal to the adding unit 9. Examples of the pre-cessings performed by the prediction error expanding unit 8 include an inverse orthogonal transformation, an inverse base transformation, an inverse waveform transformation, and an inverse quantization.

In a specific case of the H.264 coding system, with respect to the coding parameter, an inverse integer orthogonal transformation is performed in the unit of either 4×4 pixels or 8×8 pixels subsequent to the inverse quantization, so the decoded prediction error signal is produced.

In the first embodiment, the inverse quantization and the inverse integer orthogonal transformation of the H.264 coding system are described as example. However, in any sorts of inverse transforming/quantizing systems such as inverse DCT, inverse DFT, an inverse wavelet transformation, and an inverse vector quantization, similar effects may be achieved.

The adding unit 9 adds the prediction error signal entered from the signal predicting unit 4 and the decoded prediction error signal entered from the prediction error expanding unit 8, and then, outputs the added signal as a decoded signal to the decoded signal storage unit 10.

The decoded signal storage unit 10 stores therein the decoded signals entered from the adding unit 9 for 1 frame or a plurality of frames, and outputs the stored signal as a decoded signal to the signal predicting unit 4, if necessary.

Figure 10:
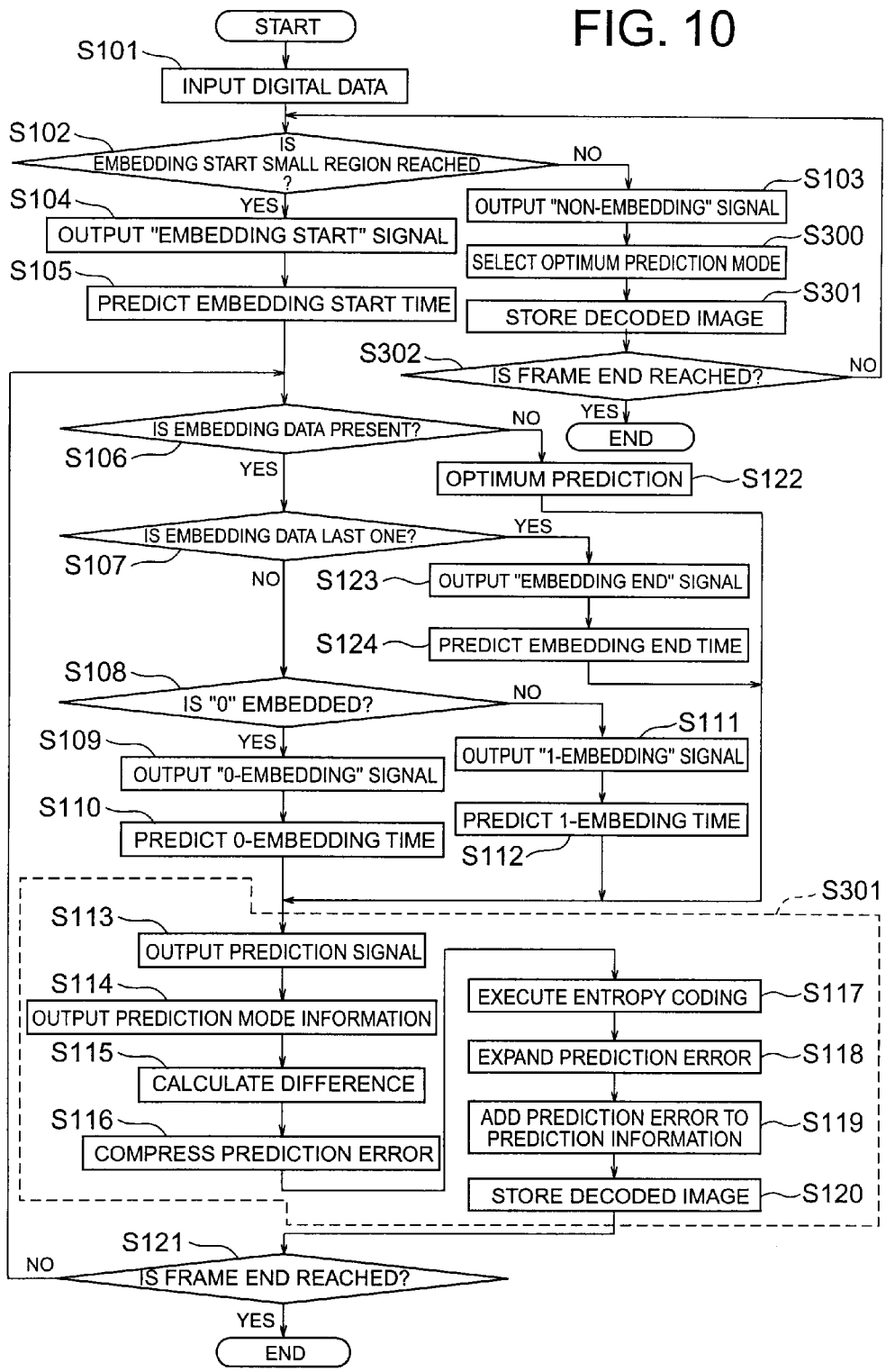
FIG. 10 is a flow chart for showing operations of the data embedding apparatus according to the first embodiment of the present invention.

Next, a description is made of operations of the data embedding apparatus 1 according to the first embodiment of the present invention with reference to FIG. 10. FIG. 10 is a flow chart for indicating the operations of the data embedding apparatus 1 according to the first embodiment of the present invention.

In a step S101, when media data is inputted to the media data input unit 2, the media data input unit 2 stores therein the media data in the unit of, for example, 1 frame. Also, the media data input unit 2 supplies each of small regions obtained by further dividing a frame, as an input signal, to the difference calculating unit 5. Also, the media input unit 2 supplies both time instant information indicative of a frame number, and positional information indicative of a position of a small region to be processed within the frame to the predicting device selecting unit 3.

In a step S102, the predicting device selecting unit 3 judges whether or not the coding process of the small region to be processed which is specified by both the inputted time instant information and the inputted positional information has reached an information embedding start small region within this frame to be processed. In a case where the small region to be processed has not yet reached the information embedding start region, the embedding operation of the data embedding apparatus 1 is advanced to a step S103. When the small region to be processed is the information embedding start small region, the embedding operation is advanced to a step S104.

In the step S103, the predicting device selecting unit 3 outputs a "non-embedding signal" to the signal predicting unit 4 as predicting device designation information, and then, the embedding operation is advanced to a step S300.

In the step S104, the predicting device selecting unit 3 outputs an "embedding start signal" to the signal predicting unit 4 as predicting device designation information, and then, the embedding operation is advanced to a step S105.

In the step S105, the signal predicting unit 4 is operated in such a manner that the embedding start predicting device 13 is selected as the predicting device.

In a step S106, the signal predicting unit 4 judges whether or not there is digital data which is to be associated with the frame to be processed. When the digital data is present, the embedding operation is advanced to a step S107, whereas when the digital data is not present, the embedding operation is advanced to a step S122.

In the step S107, the signal predicting unit 4 judges whether or not the digital data is last information which is to be associated with this frame. When the digital data is continued, the embedding operation is advanced to a step S108, whereas when the digital data is the last information, the embedding operation is advanced to a step S123.

In the step S108, the signal predicting unit 4 judges whether information to be embedded corresponds to "0" or "1" within 2 values. When the information to be embedded corresponds to "0", the embedding operation is advanced to a step S109, whereas when the information to be embedded corresponds to "1", the embedding operation is advanced to a step S111.

In the step S109, the signal predicting unit 4 outputs a "0-embedding signal" as the predicting device designation information, and then, the embedding operation is advanced to a step S110.

In the step S110, the predicting device selecting unit 3 selects the 0-embedding predicting device 15 as the predicting device, the 0-embedding predicting device 15 employs a decoded signal inputted from the decoded signal storage unit 10 so as to produce a prediction signal with respect to the input signal of the small region to be processed, and then, the embedding operation is advanced to a step S113.

In the step S111, the signal predicting unit 4 outputs a "1-embedding signal" as the predicting device designation information, and then, the embedding operation is advanced to a step S112.

In the step S112, the predicting device selecting unit 3 selects the 1-embedding predicting device 16 as the predicting device, the 1-embedding predicting device 16 employs a decoded signal inputted from the decoded signal storage unit 10 so as to produce a prediction signal with respect to the input signal of the small region to be processed, and then, the embedding operation is advanced to the step S113.

In the step S113, the signal predicting unit 4 outputs the prediction signal to both the difference calculating unit 5 and the adding unit 9, and then, the embedding operation is advanced to a step S114.

In the step S114, the signal predicting unit 4 outputs information for identifying the predicting means to be selected to the entropy coding unit 7 as prediction mode information, and then, the embedding operation is advanced to a step S115.

In the step S115, the difference calculating unit 5 enters therein the input signal from the media data input unit 2 and the prediction signal from the signal predicting unit 4 so as to perform a difference calculating operation with respect to these input signals, and outputs a prediction error signal to the prediction error compressing unit 6, and then, the embedding operation is advanced to a step S116.

In the step S116, the prediction error compressing unit 6 inputs thereinto the prediction error signal from the difference calculating unit 5, performs a data compressing operation such as a transformation and a quantization with respect to the entered prediction error signal, and outputs a coded parameter obtained by the data compressing operation to the entropy coding unit 7 and the prediction error expanding unit 8, and then, the embedding operation is advanced to a step S117.

In the step S117, the entropy coding unit 7 inputs thereinto the prediction mode information from the signal predicting unit 4 and the coded parameter from the prediction error compressing unit 6 so as to entropy-code the entered prediction mode information and the coded parameter, outputs the coded data thus obtained, and then, the embedding operation is advanced to a step S118.

In the step S118, the prediction error expanding unit 8 inputs thereinto the coded parameter from the prediction error compressing unit 6 so as to execute such a processing as the inverse transformation and the inverse quantization with respect to the entered coded parameter, which is a processing inverse to that of the prediction error compressing unit 6, and outputs the decoded prediction error signal obtained by the above-mentioned processing to the adding unit 9, and then, the embedding operation is advanced to a step S119.

In the step S119, the adding unit 9 adds the prediction error signal and the decoded prediction error signal, and outputs a decoded signal obtained by the adding operation to the decoded signal storage unit 10, and then, the embedding operation is advanced to a step S120.

In the step S120, the decoded signal storage unit 10 inputs thereinto the decoded signal, and stores therein those decoded signals for 1 frame or a plurality of frames. The decoded signal storage unit 10 outputs the decoded signals to the signal predicting unit 4, if necessary, and the embedding operation is advanced to a step S121.

In the step S121, the signal predicting unit 4 judges whether or not the frame is a last frame. When the frame is not the last frame, the embedding operation is returned to the step S106, whereas when the frame is the last frame, the embedding operation of the data embedding apparatus 1 is accomplished.

In a step S122, since any of the prediction modes may be selected, an optimum prediction mode is selected, and the selected optimum prediction device produces a prediction signal with respect to the input signal of the small region to be processed by employing the decoded signal entered from the decoded signal storage unit 10, and then, the embedding operation is advanced to the step S113.

In a step S123, in an embedding process for the next small region, the predicting device selecting unit 3 outputs the "embedding end signal" to the signal predicting unit 4 as the predicting device designation information, and then, the embedding operation is advanced to the step S112.

In the step S112, the signal predicting unit 4 is operated in such a manner that the embedding predicting end device 14 is selected as the predicting device, and then, the embedding operation is advanced to the step S113.

On the other hand, in a step S300 subsequent to the step S103, since any of the prediction modes may be selected, an optimum prediction mode is selected, and the selected prediction device produces a prediction signal with respect to the input signal of the small region to be processed by employing the decoded signal entered from the decoded signal storage unit 10. Then, the embedding process is advanced to a step S301.

In the step S301, the same series of processing as in the steps S113 to S120 are carried out, and then, the processing is advanced to a step S302.

In the step S302, the signal predicting unit 4 judges whether or not the frame end is reached. When the frame end has not been reached, the processing returns to the step S102. When the frame end has been reached, the embedding operation of the data embedding apparatus 1 is accomplished.

When the data embedding apparatus 1 according to the first embodiment encodes the media data, one prediction mode of a large number of prediction modes is allocated as the data embedding start position information, and one prediction mode of those prediction modes is allocated as the data embedding end position information. As a result, since the information for specifying the embedding position does not need to be commonly used on the encoding side and the decoding side, there is an advantage in that it is possible to prevent the entire data amount from increasing.

Also, in the case where the data embedding apparatus 1 according to the first embodiment encodes the media data, the resembled prediction modes among the large number of prediction modes are subdivided into 2 groups, and each of those 2 groups is made to correspond to the embedding information. As a result, the embedding information hardly influences the coding efficiency. Thus, even when the data amount of the embedding information is increased, there is an advantage in that it is possible to prevent the data amount of the media data from increasing.

It should be noted that although the data embedding apparatus 1 according to the first embodiment has been described as an apparatus, the same effects can be achieved even when the data embedding apparatus 1 is realized as means which does not contain a solid member, for example, software, firmware, and the like for realizing those functions.

Further, while the frame embedding start position information is inputted and the data embedding operation is carried out from the embedding start position within the frame in the data embedding apparatus 1 according to the first embodiment, the data embedding apparatus 1 is also equipped with the embedding predicting start device 13. However, by setting a predetermined rule related to the embedding start position (e.g., always starting data embedding operation from a head small region within the frame), for instance, the frame embedding start position information may not be inputted, or the embedding predicting start device 13 may not be provided.

Also, although the data embedding operation has been described by employing the 4×4 intra prediction mode, the 8×8 intra prediction mode, the 16×16 intra prediction mode, and the motion compensating prediction mode. However, all of these prediction modes need not be allocated as the prediction modes when the data is embedded. Even if a portion of these prediction modes is allocated, a similar effect may be produced.

Second Embodiment

Figure 11:
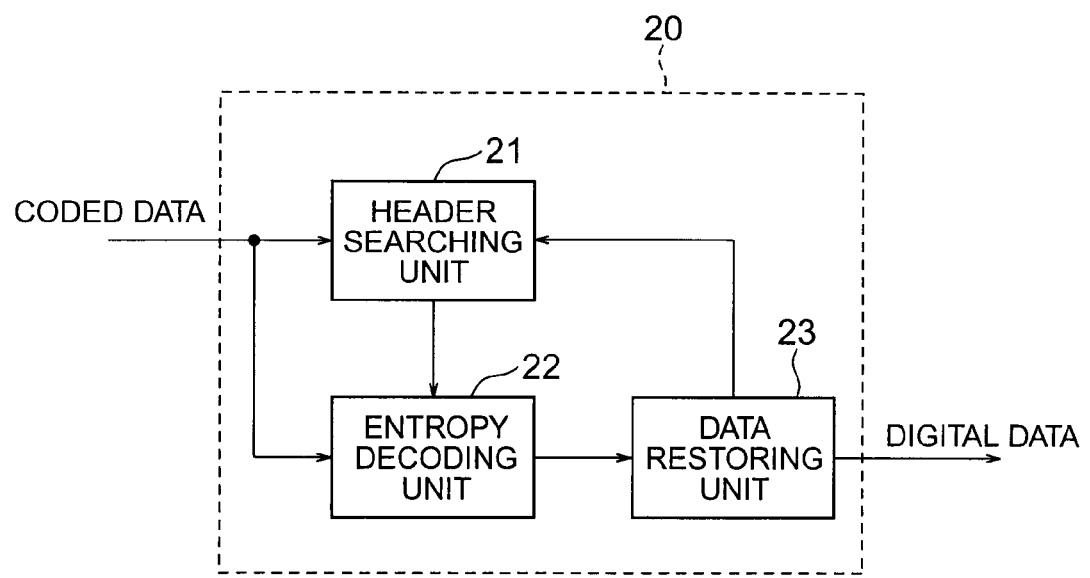
FIG. 11 is a block diagram for showing a configuration of a data extracting apparatus according to a second embodiment of the present invention.

FIG. 11 is a block diagram for indicating a configuration of a data extracting apparatus 20 according to a second embodiment of the present invention.

The coded data which is produced by the data embedding apparatus 1 of the first embodiment is inputted to the above-mentioned data extracting apparatus 20, and the digital data embedded by the data embedding apparatus 1 is extracted therefrom to be outputted from this data extracting apparatus 20.

It should be noted that in the second embodiment, description will be made of an example of employing, as coded data, a stream coded based upon the H.264 coding system. However, the present invention is not limited to the H.264 coding system as the coding system.

The data extracting apparatus 20 includes a header searching unit 21, an entropy decoding unit 22, and a data restoring unit 23.

The data extracting apparatus 20 is constituted by a computer including a CPU, a ROM, a RAM, and an interface circuit. In the data extracting apparatus 20, a program previously stored in the ROM is read out therefrom, and then, the read program is processed by the CPU so as to extract digital data from data coded with the digital data being embedded.

The coded data outputted from the data embedding apparatus 1 is entered via a recording medium or a transmission medium to the data extracting apparatus 20.

In the case where an address of coded data to be processed corresponds to a head position of the coded data, or a header search start flag to be inputted corresponds to a "header search start" signal, the header searching unit 21 searches a header which indicates the frame head position of the coded data to be inputted, and notifies frame head position information obtained from the search result to the entropy decoding unit 22.

In the H.264 coding system, a slice header where a macroblock start number becomes the number "0" has been multiplexed as a code for identifying a frame head. As a result, the header searching unit 21 can be configured in such a manner that the slice header is searched and a slice header head address is outputted as the frame head position information.

It should be noted that the present invention is not limited to the above-mentioned H.264 coding system, but any other systems maybe applied if these systems are capable of detecting head positions in a frame unit, or in predetermined coding units corresponding to the frame unit, such as a field unit, a slice unit, or a video packet unit.

The entropy decoding unit 22 reads out coded data from an address designated by the frame head position information, and outputs, as a decoded parameter, only a parameter indicative of a prediction mode utilized in a data embedding operation among parameters obtained by being entropy-decoded to the data restoring unit 23.

The data restoring unit 23 detects whether or not a decoded parameter inputted from the entropy decoding unit 22 corresponds to predicting means allocated to the embedding predicting end device 14 provided in the data embedding apparatus 1. When the decoded parameter is not the predicting means allocated to the embedding end predicting device 14, the data restoring unit 23 outputs a "header search stop" signal as a header search start flag to the header searching unit 21.

Also, when the decoded parameter corresponds to the predicting means allocated to the embedding end predicting device 14, the data restoring unit 23 stops outputting of the digital data.

Also, the data restoring unit 23 detects whether the entered decoded parameter corresponds to predicting means allocated to the 0-embedding predicting device 15, or another predicting means allocated to the 1-embedding predicting device 16 in the data embedding apparatus 1. When the decoded parameter is the predicting means allocated to the 0-embedding predicting device 15, the data restoring unit 23 outputs "0" as digital data. Conversely, when the decoded parameter is the predicting means allocated to the 1-embedding predicting device 16, the data restoring unit 23 outputs "1" as digital data.

Also, when the decoded parameter corresponds to predicting means allocated to the embedding predicting start device 13, the data restoring unit 23 notifies a "header search start" signal as the header search start flag to the header searching unit 21.

Figure 12:
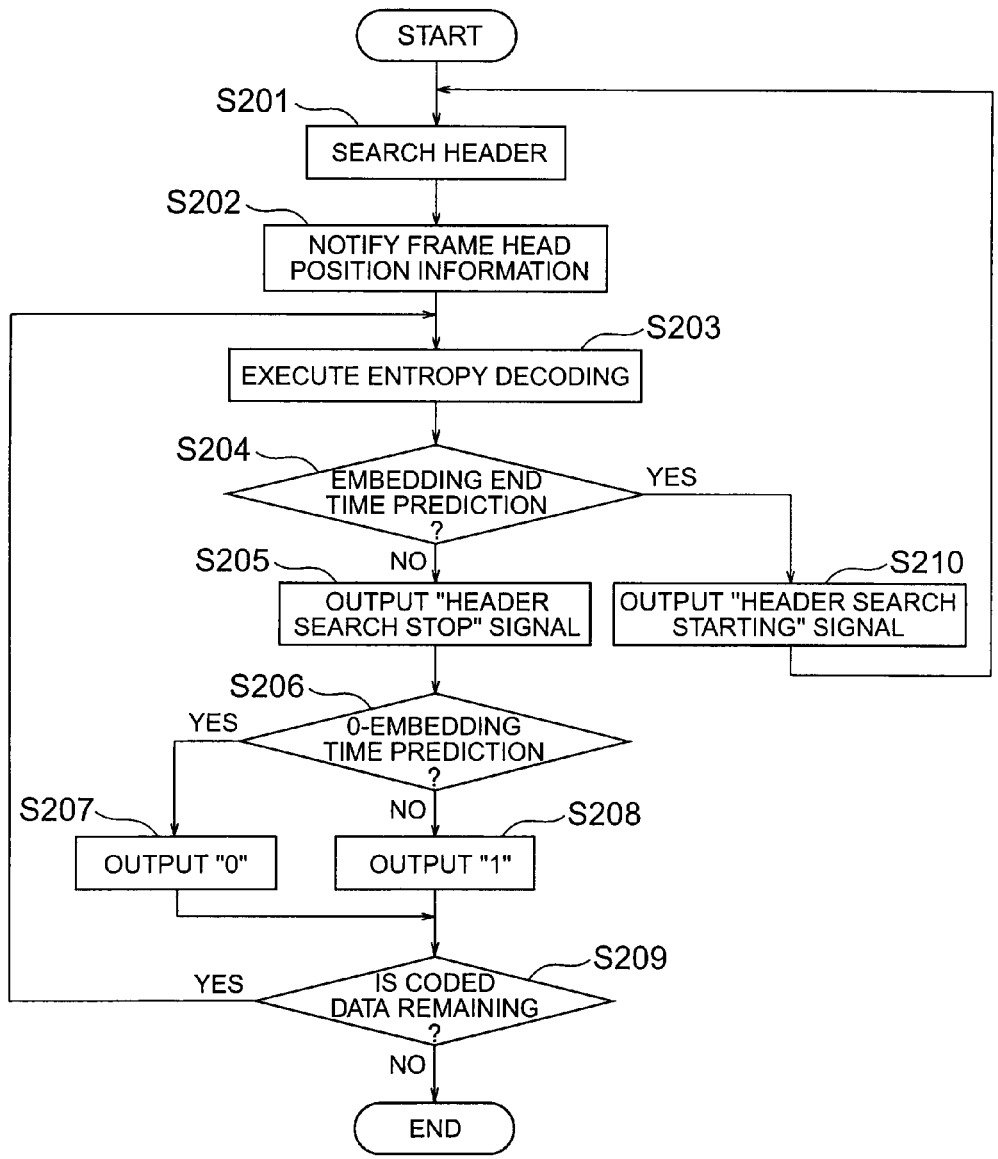
FIG. 12 is a flow chart for showing operations of the data extracting apparatus according to the second embodiment of the present invention.

Next, a description is made of operations of the data extracting apparatus 20 according to the second embodiment of the present invention with reference to FIG. 12. FIG. 12 is a flow chart for indicating the operations of the data extracting apparatus 20 according to the second embodiment of the present invention.

In a step S201, when coded data into which digital data has been embedded by the data embedding apparatus 1 according to the first embodiment of the present invention is entered to the data extracting apparatus 20, the header searching unit 21 performs a header searching operation from a head of the inputted coded data, and then, the data extracting operation is advanced to a step S202.

In the step S202, the header searching unit 21 notifies an address obtained when a header indicative of a frame head position is found to the entropy decoding unit 22 as frame head position information.

In a step S203, the entropy decoding unit 22 reads out the coded data from the address designated by the frame head position information, and outputs only a parameter indicative of the prediction mode utilized in the data embedding operation as a decoded parameter to the data restoring unit 23 within the parameters obtained by being entropy-decoded. Then, the extracting operation is advanced to a step S204.

In the step S204, the data restoring unit 23 detects whether or not the decoded parameter inputted from the entropy decoding unit 22 corresponds to predicting means allocated to the embedding predicting end device 14 provided in the data embedding apparatus 1. When the decoded parameter is not the predicting means allocated to the embedding end predicting device 14, the data extracting operation is advanced to a step S205, whereas when the decoded parameter corresponds to the predicting means allocated to the embedding predicting end device 14, the data extracting operation is advanced to a step S210.

In the step S205, the data restoring unit 23 outputs a "header search stop" signal as a header search start flag to the header searching unit 21, and then, the extracting operation is advanced to a step S206.

In the step S206, the data restoring unit 23 detects whether the entered decoded parameter corresponds to predicting means allocated to the 0-embedding predicting device 15, or another predicting means allocated to the 1-embedding predicting device 16. When the decoded parameter is the predicting means allocated to the 0-embedding predicting device 15, the extracting operation is advanced to a step S207, whereas when the decoded parameter is the predicting means allocated to the 1-embedding predicting device 16, the extracting operation is advanced to a step S208.

In the step S207, the data restoring unit 23 outputs "0" as the digital data, and then, the extracting operation is advanced to a step S209.

In the step S208, the data restoring unit 23 outputs "1" as the digital data, and then the extracting operation is advanced to a step S209.

In the step S209, the data extracting apparatus 20 judges whether or not remaining coded data is present. When the remaining coded data is present, the extracting operation is returned to the step S203, whereas when there is no remaining coded data, the extracting operation is accomplished.

In a step S210, the data extracting apparatus 20 stops outputting of the digital data, and notifies a "header search start" signal as the header search start flag to the header searching unit 21, and then, the extracting operation is returned to the step S201.

When the embedded digital data is extracted from the coded data into which the digital data has been embedded, the data extracting apparatus 20 according to the second embodiment performs the header searching operation and the variable length decoding operation, and extracts the digital data by merely allocating the decoded parameter to either "0" or "1". As a result, the embedded data can be extracted by processing of a small calculation amount.

It should be noted that the data extracting apparatus 20 according to the second embodiment is described as the apparatus, but similar effects may be achieved even when the data extracting apparatus 20 is realized as means which does not include a solid member, for example, software, firmware, and the like, which may realize those functions.

What is claimed is:

1. A data embedding apparatus for outputting coded data produced by coding first data with second data being embedded therein, comprising:
   selecting means for selecting, based upon the second data, a prediction system for calculating a prediction value, the prediction value being calculated with respect to a portion of the first data;
   predicting means for calculating the prediction value of the portion of the first data by the prediction system selected by the selecting means;
   difference calculating means for calculating a prediction error, the prediction error being calculated based on the prediction value and the portion of the first data; and
   prediction error calculating means for outputting the coded data based on receiving the prediction error,
   wherein the predicting means includes:
      0-embedding time predicting means for performing prediction when a bit value of the second data is "0";
      1-embedding time predicting means for performing prediction when the bit value of the second data is "1"; and
      embedding end time predicting means for performing prediction when embedding of the second data is accomplished.

2. The data embedding apparatus according to claim 1, wherein the portion of the first data is specified by time information indicating an image frame of the first data and position information indicating a position of a region within the image frame.

3. The data embedding apparatus according to claim 2, wherein the region includes at least one block of the image frame.

4. The data embedding apparatus according to claim 1, wherein the prediction error calculating means includes:
   prediction error compressing means for transforming and quantizing the prediction error to output a coded parameter; and
   entropy coding means for outputting the coded data obtained by entropy-coding the coded parameter.

5. The data embedding apparatus according to claim 4, further comprising:
   prediction error expanding means for inverse-quantizing and inverse-transforming the coded parameter to output a decoded prediction error;
   adding means for outputting decoded data obtained by adding the prediction value to the decoded prediction error; and
   decoded data storage means for storing the decoded data,
   wherein the predicting means performs prediction by employing the decoded data stored in the decoded data storage means.

6. The data embedding apparatus according to claim 1, further comprising a plurality of predicting means, wherein:
   the selecting means allocates predicting means whose occurrence frequency is low to the embedding end time predicting means; and
   the selecting means allocates other predicting means by which prediction values resembled to each other are calculated to the 0-embedding time predicting means and the 1-embedding time predicting means.

7. The data embedding apparatus according to claim 1, wherein:
   embedding start position information for designating a position of the first data where embedding of the second data is to be commenced is inputted; and
   the predicting means includes embedding start time predicting means for performing prediction when embedding is to be commenced at a position at which embedding of the first data is to be commenced.

8. The data embedding apparatus according to claim 7, wherein the selecting means allocates predicting means whose occurrence frequency is low to the embedding start time predicting means.

9. The data embedding apparatus according to claim 1, wherein:
   the first data comprises picture data;
   the picture data is coded by the H.264 coding system; and
   the predicting means which is allocated to the embedding end time predicting means allocates a prediction mode of one of a 4×4 intra prediction mode and an 8×8 intra prediction mode whose prediction mode number is largest.

10. The data embedding apparatus according to claim 9, wherein:
    intra prediction modes except an intra prediction mode allocated to the embedding end time predicting means are classified into two resembled groups of a first prediction mode group and a second prediction mode group;
    the 0-embedding time predicting means is allocated with predicting means belonging to the first prediction mode group; and the 1-embedding time predicting means is allocated with predicting means belonging to the second prediction mode group.

11. The data embedding apparatus according to claim 1, wherein:
the first data comprises picture data;
the picture data is coded by the H.264 coding system; and
the predicting means allocated to the embedding end time predicting means allocates a motion compensating prediction mode in which a motion vector has been shifted by a specific decimal pixel in at least one of a vertical downward direction and a horizontal rightward direction with respect to an integer pixel position.

12. The data embedding apparatus according to claim 11, wherein:
motion compensating prediction modes except a motion compensating prediction mode in which the motion vector is shifted by one of "0" and a decimal pixel in at least one of the vertical downward direction and the horizontal rightward direction with respect to the integer pixel position and allocated to the embedding end time predicting means are classified into two resembled groups of a first prediction mode group and a second prediction mode group;
the 0-embedding time predicting means is allocated with predicting means belonging to the first prediction mode group; and
the 1-embedding time predicting means is allocated with predicting means belonging to the second prediction mode group.

13. A data embedding method of outputting coded data produced by coding first data with second data being embedded therein, comprising:
a selecting step of selecting, based upon the second data, a prediction system for calculating a prediction value, the prediction value being calculated with respect to a portion of the first data;
a predicting step of calculating the prediction value of the portion of the first data by the selected prediction system;
a difference calculating step of calculating a prediction error, the prediction error being calculated based on the prediction value and the portion of the first data; and
a prediction error calculating step of outputting the coded data based on receiving the prediction error,
wherein the predicting step includes:
a 0-embedding time predicting step of performing prediction when a bit value of the second data is "0";
a 1-embedding time predicting step of performing prediction when the bit value of the second data is "1"; and
an embedding end time predicting step of performing prediction when embedding of the second data is accomplished.

14. A data extracting apparatus for extracting second data from coded data produced by coding first data with the second data being embedded therein, and outputting the extracted second data as digital data, comprising:
header searching means for retrieving header information contained in the coded data to output a header position;
decoding means for sequentially decoding at least a portion of the header information contained in the coded data beginning at the header position to output a coded prediction mode which specifies predicting means; and
data restoring means for outputting "0" as the digital data in a case where the prediction mode corresponds to a prediction mode when a bit value of the second data is "0", outputting "1" as the digital data in a case where the prediction mode corresponds to a prediction mode when the bit value of the second data is "1", and instructing the header searching means to commence a header search in a case where the prediction mode indicates that embedding of the second data is accomplished.

15. The data extracting apparatus according to claim 14, wherein the data restoring means suspends output of the digital data until the prediction mode indicating a start of embedding of the second data is decoded.

16. A data extracting method of extracting second data from coded data of first data with the second data embedded therein, and outputting the extracted second data as digital data, comprising:
a header searching step of retrieving header information contained in the coded data to output a header position;
a decoding step of sequentially decoding at least a portion of the header information contained in the coded data beginning at the header position to output a coded prediction mode which specifies predicting means; and
a data restoring step of outputting "0" as the digital data in a case where the prediction mode corresponds to a prediction mode when a bit value of the second data is "0", outputting "1" as the digital data in a case where the prediction mode corresponds to a prediction mode when the bit value of the second data is "1", and instructing to commence a header searching step in a case where the prediction mode indicates that embedding of the second data is accomplished.

* * * * *